United States Patent
Kendricks

(10) Patent No.: US 9,821,600 B2
(45) Date of Patent: Nov. 21, 2017

(54) SAFETY DEFLATION WHEEL SEAL DESIGN

(71) Applicant: GOODRICH CORPORATION, Charlotte, NC (US)

(72) Inventor: Warren Kendricks, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 190 days.

(21) Appl. No.: 14/686,512

(22) Filed: Apr. 14, 2015

(65) Prior Publication Data

US 2016/0303904 A1 Oct. 20, 2016

(51) Int. Cl.
*B60B 25/00* (2006.01)
*B60B 25/12* (2006.01)
*B60B 25/22* (2006.01)
*B60C 29/06* (2006.01)

(52) U.S. Cl.
CPC ............ *B60B 25/002* (2013.01); *B60B 25/00* (2013.01); *B60B 25/12* (2013.01); *B60B 25/22* (2013.01); *B60C 29/068* (2013.01); *B60B 2900/3312* (2013.01); *B60Y 2200/51* (2013.01)

(58) Field of Classification Search
CPC ......... B60B 23/00; B60B 23/06; B60B 23/10; B60B 25/04; B60B 25/08; B60B 25/10; B60B 25/12
USPC ........................... 152/396–398, 406, 411–413
See application file for complete search history.

(56) References Cited

U.S. PATENT DOCUMENTS

| | | | |
|---|---|---|---|
| 3,882,919 A | 5/1975 | Sons, Jr. et al. | |
| 4,106,543 A | 8/1978 | Sano | |
| 4,123,112 A * | 10/1978 | Mills | B60B 25/22 152/404 |
| 4,165,777 A * | 8/1979 | Sano | B60B 25/22 152/411 |
| 4,389,051 A | 6/1983 | Mullaney | |
| 4,481,997 A | 11/1984 | Strader | |
| 4,640,330 A | 2/1987 | Frassica | |

(Continued)

FOREIGN PATENT DOCUMENTS

| | | |
|---|---|---|
| CH | 678039 | 7/1991 |
| DE | 3822852 | 1/1990 |

(Continued)

OTHER PUBLICATIONS

EP Search Report dated Sep. 15, 2017 in EP Application No. 16165159.1.

*Primary Examiner* — Jason R Bellinger
(74) *Attorney, Agent, or Firm* — Snell & Wilmer, L.L.P.

(57) ABSTRACT

A wheel includes an inner wheel half defining a plurality of inner bolt apertures and having a mating surface. The wheel also includes an outer wheel half defining a plurality of outer bolt apertures and having an inner surface. The plurality of outer bolt apertures are configured to be aligned with the plurality of inner bolt apertures such that each of a plurality of bolts may be received by one of the plurality of outer bolt apertures and one of the plurality of inner bolt apertures, forming a seal between the mating surface and the inner surface in response to each of the plurality of bolts being tightened. In response to a predetermined number of bolts becoming loose, a first portion of the mating surface may separate from a second portion of the inner surface, breaking the seal.

15 Claims, 8 Drawing Sheets

(56) References Cited

U.S. PATENT DOCUMENTS

| | | | |
|---|---|---|---|
| 4,836,261 A | | 6/1989 | Weeks et al. |
| 4,997,235 A | * | 3/1991 | Braungart ................ B60B 3/06 |
| | | | 152/396 |
| 5,018,566 A | | 5/1991 | Thoni |
| 5,343,920 A | | 9/1994 | Cady |
| 7,083,238 B2 | | 8/2006 | Clements et al. |
| 8,505,598 B2 | * | 8/2013 | Marsaly ................ B60B 25/002 |
| | | | 152/396 |
| 2005/0236081 A1 | * | 10/2005 | Marsaly .................. B60B 3/02 |
| | | | 152/396 |
| 2006/0037685 A1 | | 2/2006 | Clements |

FOREIGN PATENT DOCUMENTS

| | | | | |
|---|---|---|---|---|
| DE | 102012103004 | | 6/2013 | |
| DE | 102014218100 A1 | * | 3/2016 | ............. B60B 25/04 |
| EP | 0404708 | | 12/1990 | |
| EP | 2279881 | | 2/2011 | |
| FR | 2192006 | | 2/1974 | |
| GB | 830168 | | 3/1960 | |
| WO | 2003037653 | | 5/2003 | |
| WO | WO 2008/052284 | | 5/2008 | |

\* cited by examiner

SAFETY DEFLATION WHEEL SEAL DESIGN

FIELD

The present disclosure relates to a wheel of an aircraft and, more particularly, to a wheel of an aircraft that is designed to deflated in response to a predetermined number of bolts becoming loose.

BACKGROUND

Aircraft may include landing gear having wheels for supporting the weight of the aircraft while the aircraft is not flying. Each wheel may include two parts coupled together via bolts. The bolts may secure the first part of the wheel to the second part of the wheel. A tire may be coupled to each wheel such that a volume capable of receiving pressurized air is defined by the tire, the first part of the wheel and the second part of the wheel.

SUMMARY

According to various embodiments, a wheel includes an inner wheel half defining a plurality of inner bolt apertures and having a mating surface. The wheel also includes an outer wheel half defining a plurality of outer bolt apertures and having an inner surface. The plurality of outer bolt apertures are configured to be aligned with the plurality of inner bolt apertures such that each of a plurality of bolts may be received by one of the plurality of outer bolt apertures and one of the plurality of inner bolt apertures, forming a seal between the mating surface and the inner surface in response to each of the plurality of bolts being tightened. In response to a predetermined number of bolts becoming loose, a first portion of the mating surface may separate from a second portion of the inner surface, breaking the seal.

According to various embodiments, a wheel includes an inner wheel half defining a plurality of inner bolt apertures and having a mating surface. The wheel includes an outer wheel half defining a plurality of outer bolt apertures and having an inner surface defining an annular cavity. The plurality of outer bolt apertures are configured to be aligned with the plurality of inner bolt apertures such that each of a plurality of bolts may be received by one of the plurality of outer bolt apertures and one of the plurality of inner bolt apertures. The wheel also includes an O-ring configured to be positioned within the annular cavity such that in response to each of the plurality of bolts being tightened, a seal is formed by compression of the O-ring between the mating surface and the inner surface. In response to a predetermined number of bolts becoming loose, compression of the O-ring is reduced, breaking the seal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
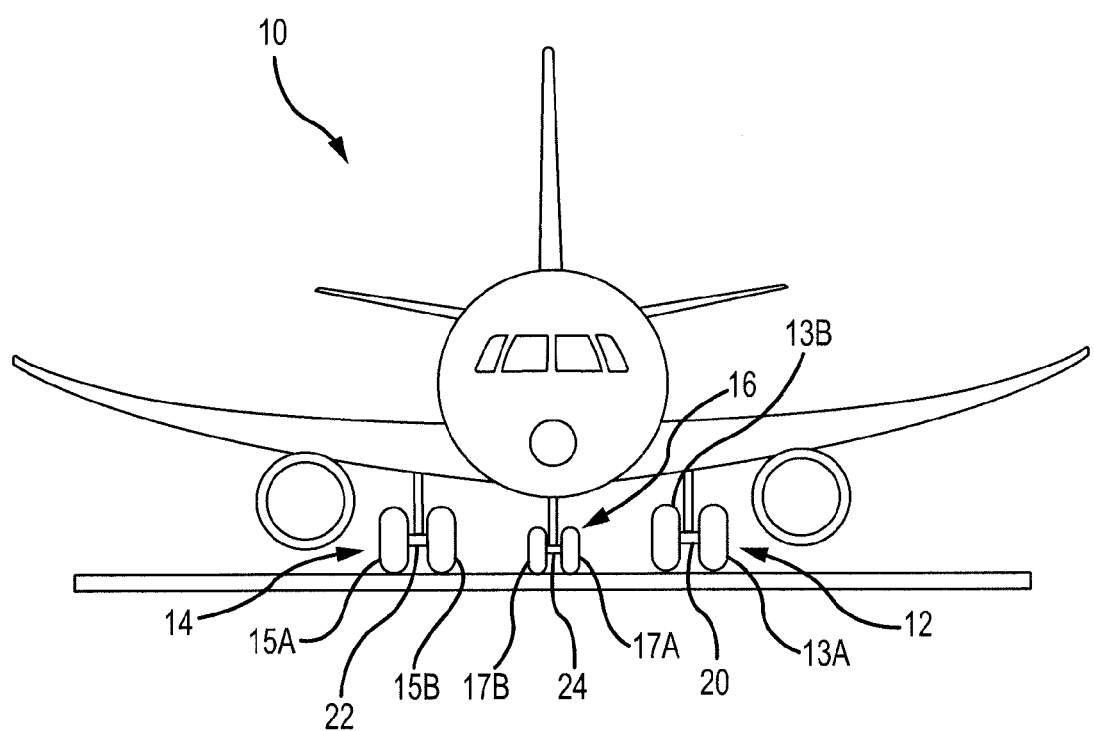
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. The nose wheels differ from the main wheels in that the nose wheels may not include a brake and/or a wheel speed transducer. An A-R-C axis is used throughout the drawings to illustrate the axial (A), radial (R) and circumferential (C) directions relative to wheel 15A.

Figure 2:
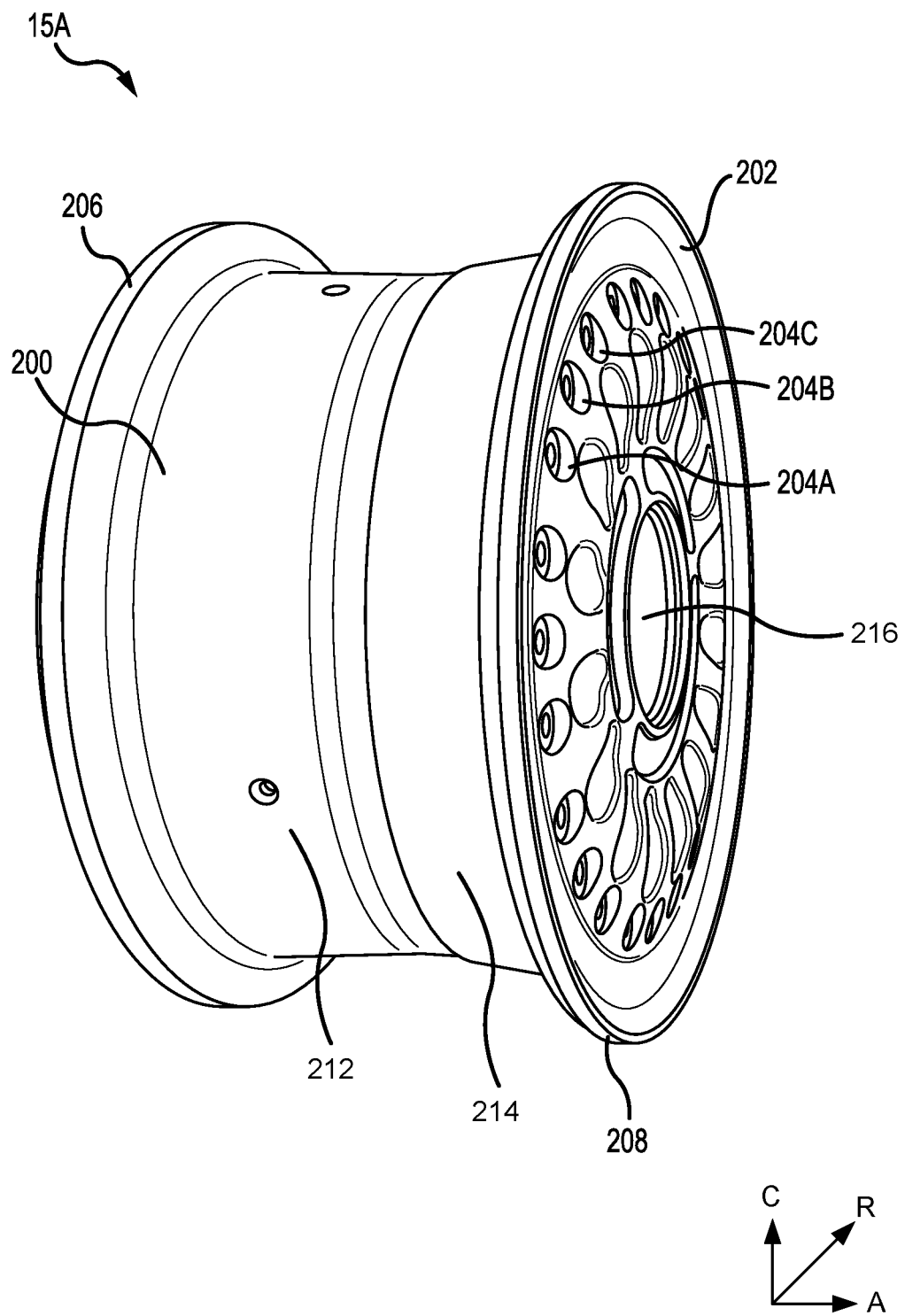
FIG. 2 is a perspective view of a wheel of an aircraft including an outer wheel half and an inner wheel half, in accordance with various embodiments.

With reference now to FIG. 2, wheel 15A in accordance with various embodiments includes an inner wheel half 200 and an outer wheel half 202. Outer wheel half 202 defines a plurality of outer bolt apertures including outer bolt aperture 204A, outer bolt aperture 204B and outer bolt aperture 204C, that are designed to receive bolts.

Inner wheel half 200 includes a first outer surface 212 that defines a first flange 206 at an outer axial end of inner wheel half 200. Similarly, outer wheel half 202 includes a second outer surface 214 that defines a second flange 208 on an outer axial end of outer wheel half 202.

Figure 3:
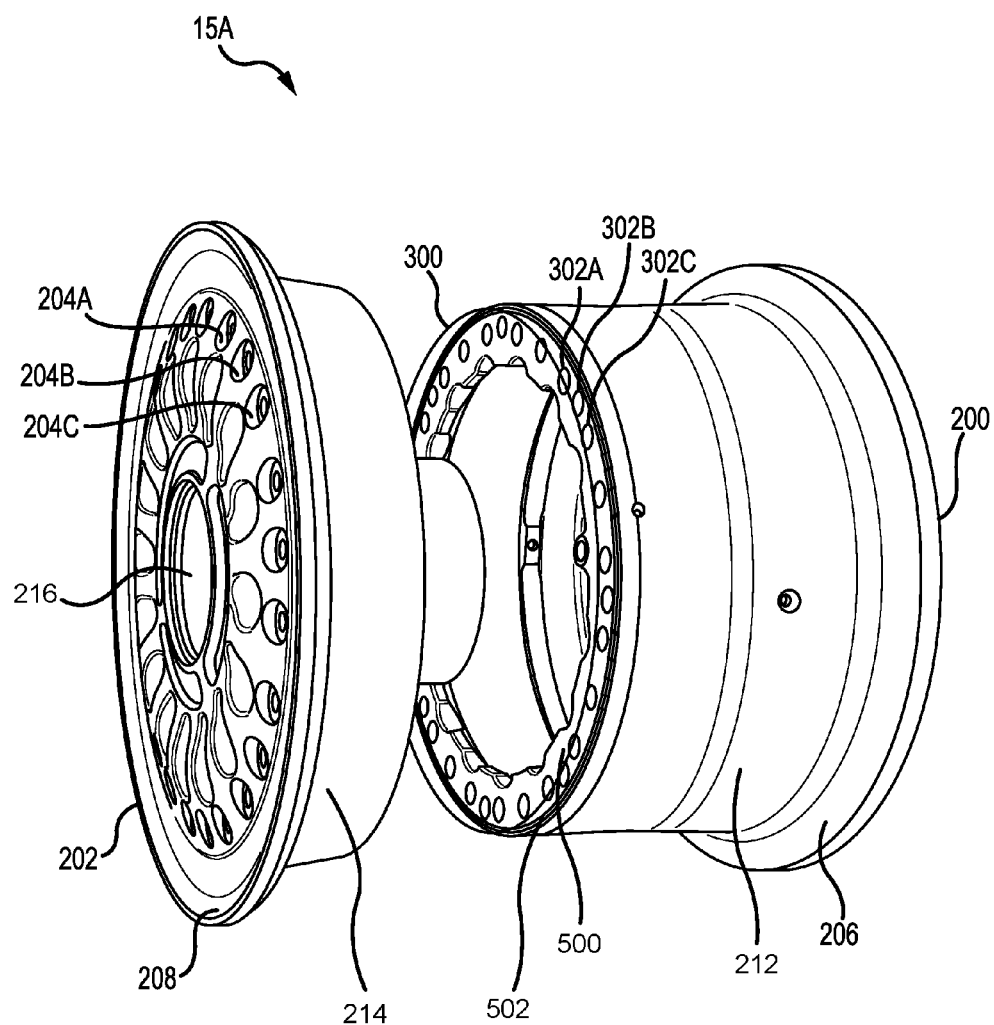
FIG. 3 is an exploded view of the wheel of FIG. 2, in accordance with various embodiments.

With reference now to FIG. 3, inner wheel half 200 may define an inner surface 500 that aligns with a mating surface of outer wheel half 202. Inner surface 500 may define an annular cavity 502. Annular cavity 502 may be configured to receive an O-ring 300. In that regard, O-ring 300 may be positioned in annular cavity 502 and, in response to outer wheel half 202 being coupled to inner wheel half 200, O-ring 300 may contact an inner surface of outer wheel half 202 and inner surface 500 of inner wheel half 200 within annular cavity 502. Thus, O-ring 300 may form a seal between outer wheel half 202 and inner wheel half 200 such that pressurized air may not escape between outer wheel half 202 and inner wheel half 200 where they are in contact with O-ring 300. In various embodiments, a seal may be formed between mating surface 504 (see FIG. 5) and contact surface 610 (see FIG. 6) of outer wheel half 202 without use of an O-ring.

Like outer wheel half 202, inner wheel half 200 may define a plurality of inner bolt apertures including inner bolt aperture 302A, inner bolt aperture 302B and inner bolt aperture 302C. The inner bolt apertures may align with the outer bolt apertures of outer wheel half 202 such that outer wheel half 202 and inner wheel half 200 may be coupled together via bolts received by the outer bolt apertures and the inner bolt apertures. In that regard, a bolt may be coupled to the inner bolt apertures and the outer bolt apertures via threading defined by the inner bolt apertures and/or the outer bolt apertures and/or may be coupled via a nut.

With reference now to FIGS. 2 and 3, when outer wheel half 202 is coupled to inner wheel half 200, a tire may be positioned on wheel 15A such that the tire is positioned between first flange 206 and second flange 208. A pressurizable volume is then defined by the tire, first outer surface 212 and second outer surface 214 when outer wheel half 202 is coupled to inner wheel half 200. The volume may then be pressurized and the tire may be caused to remain in position relative to wheel 15A by first flange 206 and second flange 208.

In conventional systems, loosening of at least one bolt leads to rapid loosening of multiple bolts. This results in a gap of a size and position that causes undesired rapid deflation of the tire.

Accordingly, it may be desirable to cause the pressurized air to escape in a less rapid manner in response to a predetermined number of bolts becoming loose so that a maintenance crew can be alerted to loose bolts prior to takeoff of the aircraft. For example, it may be desirable for the tire to deflate in response to two bolts, three bolts, four bolts or the like becoming loose. Setting the predetermined number of bolts to two, three or four bolts may tend to prevent undesirable deflation of the tire. In various embodiments, the predetermined number of bolts may be adjacent or may be in the same area (i.e., within the same quadrant) of wheel 15A. In various embodiments, the predetermined number of bolts may be positioned anywhere on wheel 15A.

In response to the predetermined number of bolts becoming loose, an axial force on at least a portion of O-ring 300 proximate the loose bolts may become reduced. Where referenced herein, a bolt may be loose if it can move relative to outer wheel half 202 and/or inner wheel half 200. In response, the seal formed by O-ring 300 may not prevent leakage of all the pressurized air. In that regard, air may leak between outer wheel half 202 and inner wheel half 200 as a result of the reduced axial force on O-ring 300. This allows pressurized air to flow out the volume defined by the tire, first outer surface 212 and second outer surface 214 to flow through outer bolt apertures 204, a center opening 216 of outer wheel half 202, bolt apertures of inner wheel half 200 and/or a center opening of inner wheel half 200.

Figure 4:
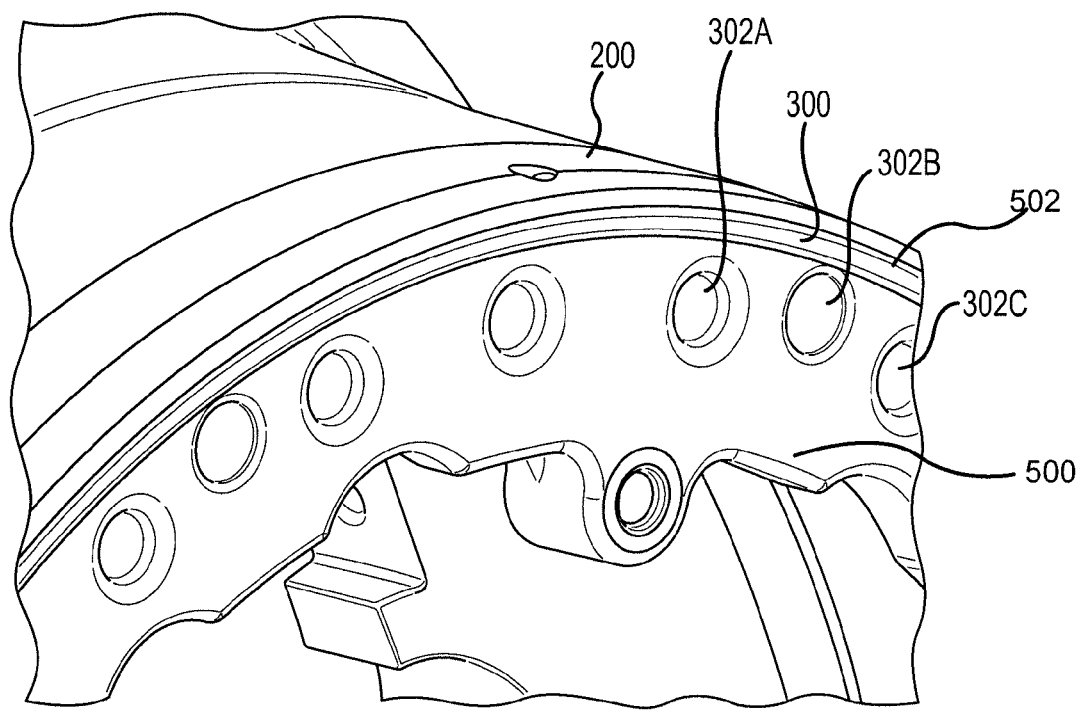
FIG. 4 is an enlarged view of a portion of the inner wheel half of FIG. 2, in accordance with various embodiments.

With reference now to FIG. 4, O-ring 300 is illustrated to be positioned within annular cavity 502. O-ring 300 may substantially fill annular cavity 502 such that O-ring 300 may fill between seventy percent (70%) and one hundred percent (100%) of annular cavity 502. In various embodiments, O-ring 300 may be compressed within annular cavity 502.

Figure 5:
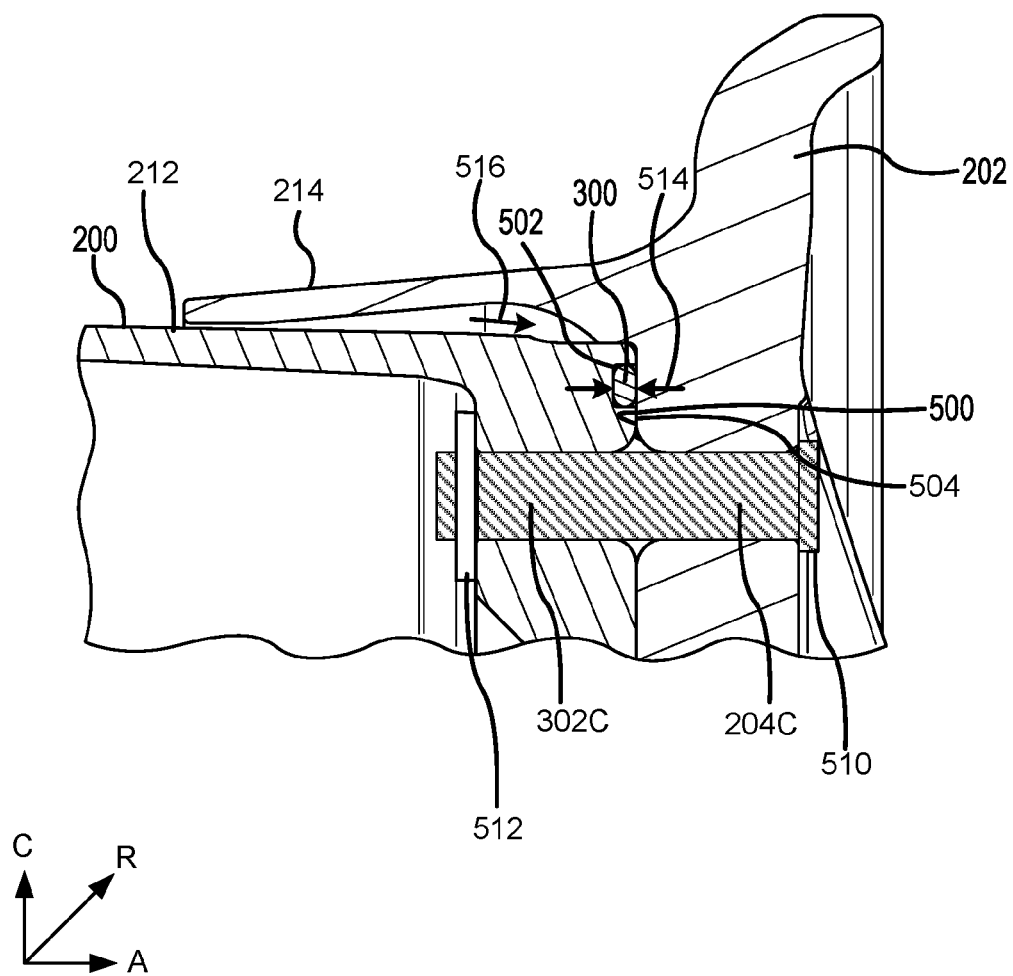
FIG. 5 is an enlarged view of an intersection of the outer wheel half of FIG. 2 and the inner wheel half of FIG. 2, in accordance with various embodiments.

With reference now to FIG. 5, inner surface 500 of inner wheel half 200 is positioned adjacent a mating surface 504 of outer wheel half 202. As illustrated, inner bolt aperture 302C is aligned with outer bolt aperture 204C such that a bolt 510 may be received by inner bolt aperture 302C and outer bolt aperture 204C at the same time. Bolt 510 may be received by a nut 512. When bolt 510 is fastened to nut 512, bolt 510 and nut 512 create an inward force in the axial direction, indicated by arrow 514. The axial force compresses O-ring 300 such that O-ring 300 tends to prevent pressurized air from escaping.

When bolt 510 is fastened to nut 512, O-ring 300 may be positioned in annular cavity 502. A mating surface 504 of outer wheel half 202 may become flush with inner surface 500 of inner wheel half 200 and thus make contact with O-ring 300. Bolt 510 may resist axial movement of inner wheel half 200 relative to outer wheel half 202 due to the force illustrated by arrow 514. In that regard, O-ring 300 may form a seal, preventing pressurized air from leaking between inner wheel half 200 and outer wheel half 202. However, if bolt 510 becomes loose, it may not resist as much axial movement of inner wheel half 200 relative to outer wheel half 202. In that regard, inner wheel half 200 and outer wheel half 202 may separate. In response to the predetermined number of bolts becoming loose, inner wheel half 200 and outer wheel half 202 may separate by a distance so that the pressurized air may leak, as indicated by arrow 516.

The design of wheel 15A provides several benefits and advantages. For example, in response to bolts of wheel 15A loosening, wheel 15A is less likely to become damaged by unzipping as a traditional wheel would be. Similarly, wheel 15A is less likely to unzip during taxi, takeoff and landing, preventing additional damage to wheel 15A and/or the aircraft. Additionally, inner wheel half 200 and outer wheel half 202 may be manufactured using existing forging dies. The forged wheel may then be machined to include the features illustrated in the present drawings. Being capable of manufacturing wheel 15A using existing forging dies reduces the cost of manufacture.

Figure 6:
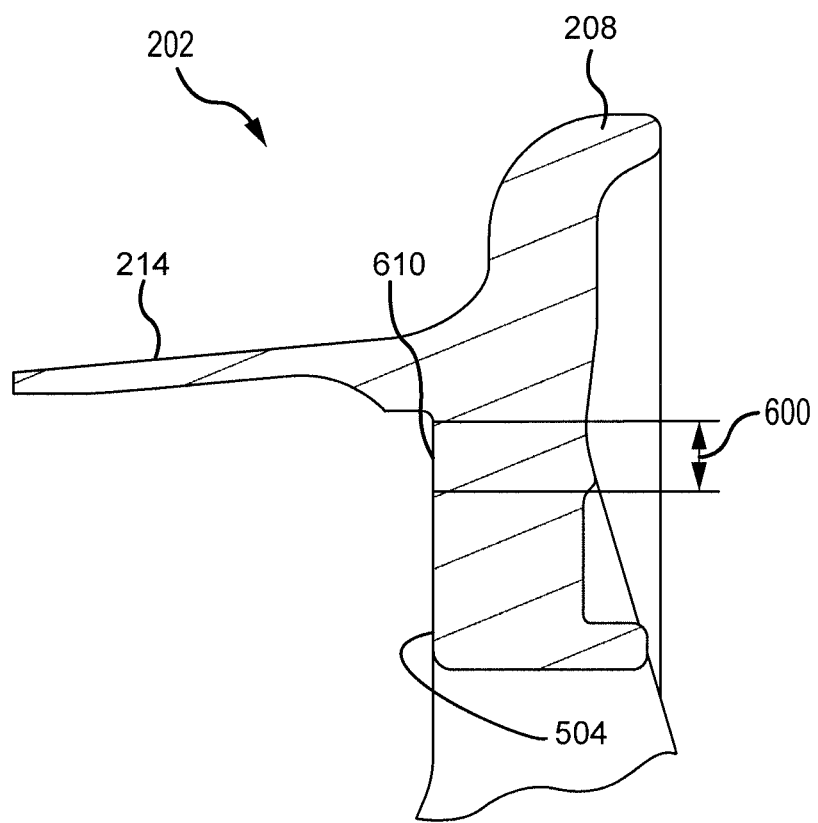
FIG. 6 is a schematic drawing of a portion of the outer wheel half of FIG. 2, in accordance with various embodiments.
Figure 6:
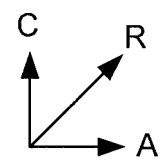

With reference now to FIG. 6, mating surface 504 of outer wheel half 202 may include a contact surface 610 proximate a radially outward end of mating surface 504. With brief reference to FIGS. 5 and 6, O-ring 300 may contact mating surface 504 at contact surface 610. In that regard, it may be desirable for contact surface 610 to be flat (i.e., no curvature or angles formed by contact surface 610, as illustrated in FIG. 6) and smooth such that O-ring 300 may form a seal that resists pressurized air. Contact surface 610 may have a radial distance 600. In various embodiments, radial distance 600 may be 0.5 inches (1.27 cm). In various embodiments, contact surface 610 may be positioned elsewhere on mating surface 504. Likewise, in various embodiments, mating surface 504 may not be completely flat or smooth.

Figure 7:
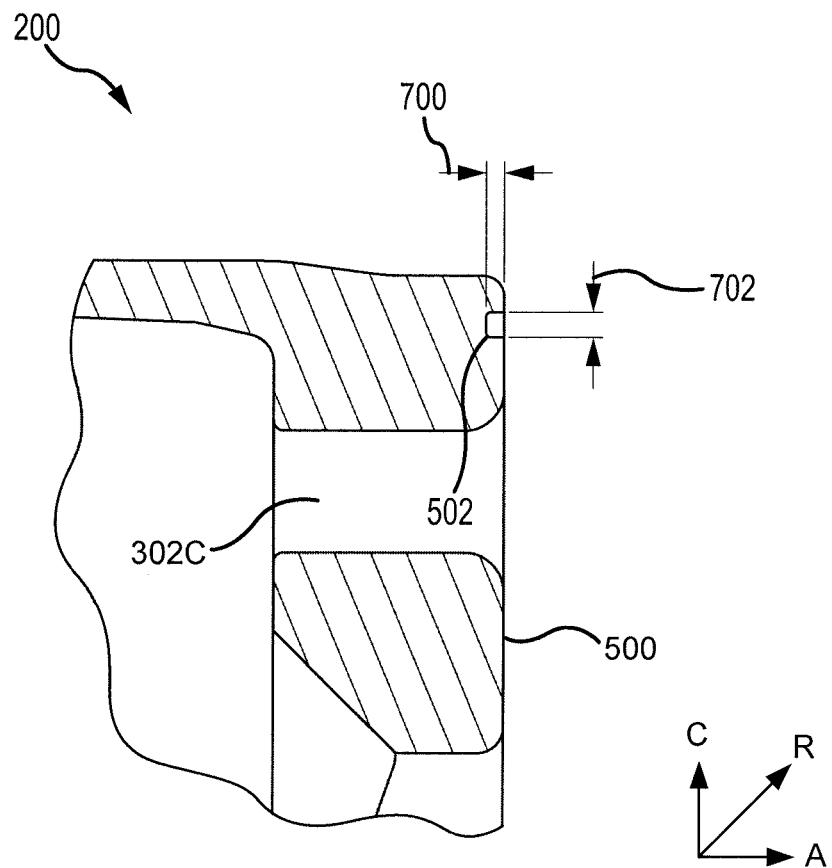
FIG. 7 is a schematic drawing of a portion of the inner wheel half of FIG. 2, in accordance with various embodiments.

With reference now to FIG. 7, annular cavity 502 may be positioned on inner surface 500 as shown. In various embodiments, annular cavity 502 may be positioned on inner surface 500. Annular cavity 502 may have an axial distance 700 and a radial distance 702. In various embodiments, axial distance 700 may be between 0.087 inches and 0.090 inches (0.22098 cm and 0.2286 cm) and radial distance 702 may be between 0.120 inches and 0.125 inches (0.3048 cm and 0.3175 cm).

Figure 8B:
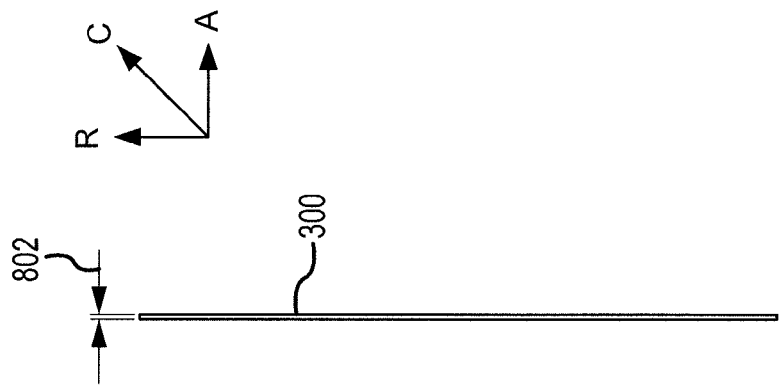
FIG. 8B is a schematic drawing of the O-ring of FIG. 8A shown along a circumferential direction, in accordance with various embodiments.
Figure 8A:
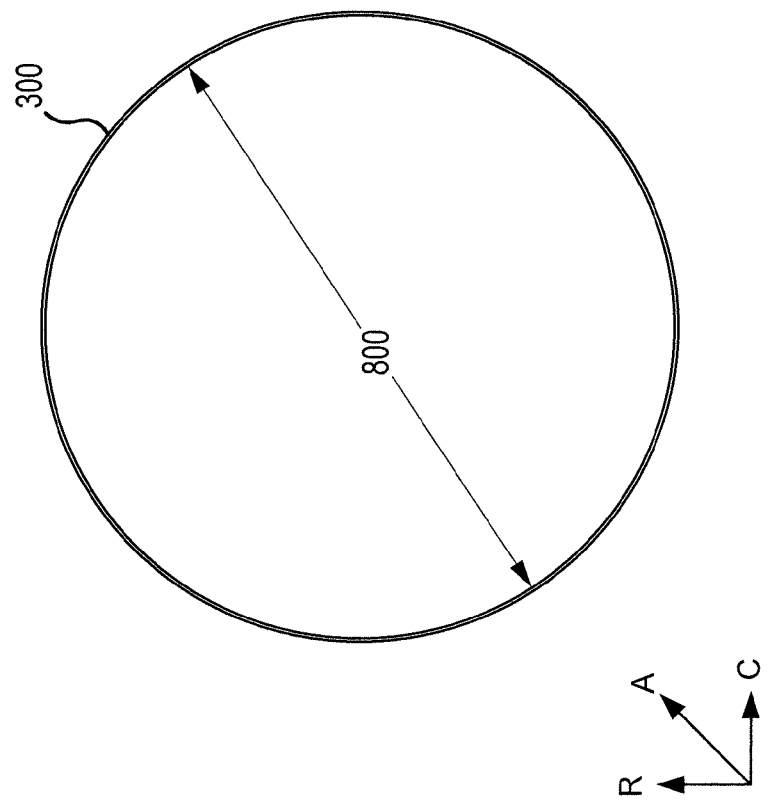
FIG. 8A is a schematic drawing of an O-ring for use between the inner wheel half of FIG. 2 and the outer wheel half of FIG. 2 shown along an axial direction, in accordance with various embodiments.

With reference now to FIG. 8A, O-ring 300 includes an annular shape. O-ring 300 may have a diameter 800 that is between 19.215 inches (48.8061 cm) and 19.415 inches (49.3141 cm). With reference now to FIG. 8B, O-ring 300 may have a thickness 802 that is between 0.1 inches (0.254 cm) and 0.106 inches (0.26924 cm).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel comprising:
an inner wheel half defining a plurality of inner bolt apertures and having an inner surface extending from a first outer diameter surface to a first inner diameter surface, wherein the inner surface is planar from the first outer diameter surface to the first inner diameter surface relative to the inner wheel half; and
an outer wheel half defining a plurality of outer bolt apertures and having a mating surface extending from a second outer diameter surface to a second inner diameter surface, wherein the second outer diameter surface extends towards the inner wheel half to define an airflow path between the second outer diameter surface and the first outer diameter surface of the inner wheel half, wherein the mating surface is planar from the second outer diameter surface to the second inner diameter surface relative to the outer wheel half, the plurality of outer bolt apertures configured to be aligned with the plurality of inner bolt apertures such that each of a plurality of bolts may be received by one of the plurality of outer bolt apertures and one of the plurality of inner bolt apertures, forming a seal between the mating surface and the inner surface in response to each of the plurality of bolts being tightened,
wherein, in response to a predetermined number of bolts becoming loose, a first portion of the mating surface may separate from a second portion of the inner surface, breaking the seal.

2. The wheel of claim 1, wherein the predetermined number of bolts is between 2 and 4.

3. The wheel of claim 1, wherein the inner surface defines an annular cavity configured to receive an O-ring, such that an O-ring seal is formed by the O-ring between a contact surface of the mating surface and the inner surface.

4. The wheel of claim 3, wherein the O-ring is compressed in an axial direction relative to the wheel in response to each of the plurality of bolts being tightened.

5. The wheel of claim 4, wherein, in response to the predetermined number of bolts becoming loose, the O-ring becomes uncompressed.

6. The wheel of claim 1, wherein the inner wheel half defines a first flange and the outer wheel half defines a second flange configured to have a tire disposed between the first flange and the second flange.

7. The wheel of claim 6, wherein a volume is defined between the tire, the first outer diameter surface of the inner wheel half and the second outer diameter surface of the outer wheel half such that in response to the seal being formed, the volume is pressurizable.

8. The wheel of claim 7, wherein in response to the first portion of the mating surface being separated from the second portion of the inner surface, pressurized air in the volume exits the volume through the airflow path and between the first portion of the mating surface and the second portion of the inner surface.

9. The wheel of claim 3, wherein the contact surface is flat relative to the mating surface.

10. A wheel comprising:
an inner wheel half defining a plurality of inner bolt apertures, defining an annular cavity and having an inner surface extending from a first outer diameter surface to a first inner diameter surface, wherein the second outer diameter surface extends towards the inner wheel half to define an airflow path between the second outer diameter surface and the first outer diameter surface of the inner wheel half, wherein the inner surface is planar from the first outer diameter surface to the first inner diameter surface relative to the inner wheel half;

an outer wheel half defining a plurality of outer bolt apertures and having a mating surface extending from a second outer diameter surface to a second inner diameter surface, wherein the mating surface is planar from the second outer diameter surface to the second inner diameter surface relative to the outer wheel half, the plurality of outer bolt apertures configured to be aligned with the plurality of inner bolt apertures such that each of a plurality of bolts may be received by one of the plurality of outer bolt apertures and one of the plurality of inner bolt apertures; and an O-ring configured to be positioned within the annular cavity such that in response to each of the plurality of bolts being tightened, a seal is formed by compression of the O-ring between a contact surface of the mating surface and the inner surface, wherein in response to a predetermined number of bolts becoming loose, compression of the O-ring is reduced, breaking the seal.

11. The wheel of claim 10, wherein the predetermined number of bolts is between 2 and 4.

12. The wheel of claim 10, wherein the inner wheel half defines a first flange and the outer wheel half defines a second flange configured to have a tire disposed between the first flange and the second flange.

13. The wheel of claim 12, wherein a volume is defined between the tire, the first outer diameter surface of the inner wheel half and the second outer diameter surface of the outer wheel half such that in response to the seal being formed, the volume is pressurizable.

14. The wheel of claim 13, wherein in response to the predetermined number of bolts becoming loose, pressurized air may escape the volume through the airflow path and between the mating surface, the inner surface and the O-ring.

15. The wheel of claim 10, wherein the contact surface is flat relative to the mating surface.

* * * * *